United States Patent
Liu et al.

(10) Patent No.: US 8,363,358 B2
(45) Date of Patent: Jan. 29, 2013

(54) PIVOT-CARRIAGE HAVING A CENTER-BORE WITH AN INTEGRATED BEARING-SPACER PORTION

(75) Inventors: Shaoyong Liu, Singapore (SG); Hock Leong Neo, Singapore (SG); Yi Zhao Yao, Singapore (SG)

(73) Assignee: HGST, Netherlands B.V., Amsterdam (NL)

( * ) Notice: Subject to any disclaimer, the term of this patent is extended or adjusted under 35 U.S.C. 154(b) by 1202 days.

(21) Appl. No.: 12/192,344

(22) Filed: Aug. 15, 2008

(65) Prior Publication Data

US 2010/0039733 A1 Feb. 18, 2010

(51) Int. Cl.
*G11B 5/55* (2006.01)
(52) U.S. Cl. .................................................. 360/265.2
(58) Field of Classification Search ............... 360/265.2, 360/265.4
See application file for complete search history.

(56) References Cited

U.S. PATENT DOCUMENTS

| | | | |
|---|---|---|---|
| 4,993,851 A | 2/1991 | Nakanishi | |
| 5,260,847 A | 11/1993 | Basehore et al. | |
| 5,315,465 A | 5/1994 | Blanks | |
| 5,894,382 A | 4/1999 | Hyde | |
| 6,327,115 B1 * | 12/2001 | Satoh et al. | 360/99.08 |
| 6,411,471 B1 | 6/2002 | Liu et al. | |
| 6,527,449 B1 | 3/2003 | Koyama et al. | |
| 7,056,030 B2 | 6/2006 | Koyama et al. | |
| 2002/0006015 A1 | 1/2002 | Mouri et al. | |
| 2005/0146809 A1 | 7/2005 | Aoyagi et al. | |
| 2005/0213255 A1 | 9/2005 | Deguchi et al. | |

FOREIGN PATENT DOCUMENTS

JP 2001-084716 3/2001

OTHER PUBLICATIONS

Obara, Rikuro "Technical Conference—HDD Spindle Motor Bearing", Minebea Co., Ltd http://www.minebea.co.jp/english/investors/disclosure/presentation/p2000/slide_tech0324.html, (Mar. 24, 2000),14 pages.

* cited by examiner

Primary Examiner — David D Davis

(57) ABSTRACT

An integrated pivot-carriage for a hard-disk drive. The integrated pivot-carriage includes a carriage having a center-bore with an integrated bearing-spacer portion. The integrated pivot-carriage also includes a pivot-shaft configured to provide support for rotation of the carriage. The pivot-shaft is disposed within the center-bore of the carriage. In addition, the integrated pivot-carriage includes at least one raceless ball-bearing that is configured to allow rotation of the carriage about the pivot-shaft. The raceless ball-bearing is disposed between the pivot-shaft and the carriage.

16 Claims, 6 Drawing Sheets

PIVOT-CARRIAGE HAVING A CENTER-BORE WITH AN INTEGRATED BEARING-SPACER PORTION

TECHNICAL FIELD

Embodiments of the present invention relate generally to the field of hard-disk-drive manufacturing.

BACKGROUND

The magnetic-recording, hard-disk-drive (HDD) industry is extremely competitive. The demands of the market for ever increasing storage capacity, storage speed, and other enhancement features compounded with the desire for low cost creates tremendous pressure for manufacturing economies. Therefore, any cost savings that can be found in the manufacturing process attracts significant attention on the part of engineers assigned the task of manufacturing these complex devices.

One area of the manufacturing process where considerable economies can be made is in the reduction of the number of parts used in the HDD. Therefore, engineers are constantly striving to find more elegant and efficient designs both to reduce the number of parts, and the attending assembly costs associated with those parts, and to improve the quality of the assembled HDD, which often results when fewer parts are incorporated in an HDD design that otherwise might introduce other sources of failure. Therefore, lowering the cost of HDDs and improving the reliability of HDDs through innovations directed towards more elegant and efficient designs with fewer parts are of paramount importance for maintaining a competitive edge in the HDD manufacturing business.

SUMMARY

Embodiments of the present invention include an integrated pivot-carriage for a hard-disk drive. The integrated pivot-carriage includes a carriage having a center-bore with an integrated bearing-spacer portion. The integrated pivot-carriage also includes a pivot-shaft configured to provide support for rotation of the carriage. The pivot-shaft is disposed within the center-bore of the carriage. In addition, the integrated pivot-carriage includes at least one raceless ball-bearing that is configured to allow rotation of the carriage about the pivot-shaft. The raceless ball-bearing is disposed between the pivot-shaft and the carriage.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Figure 1:
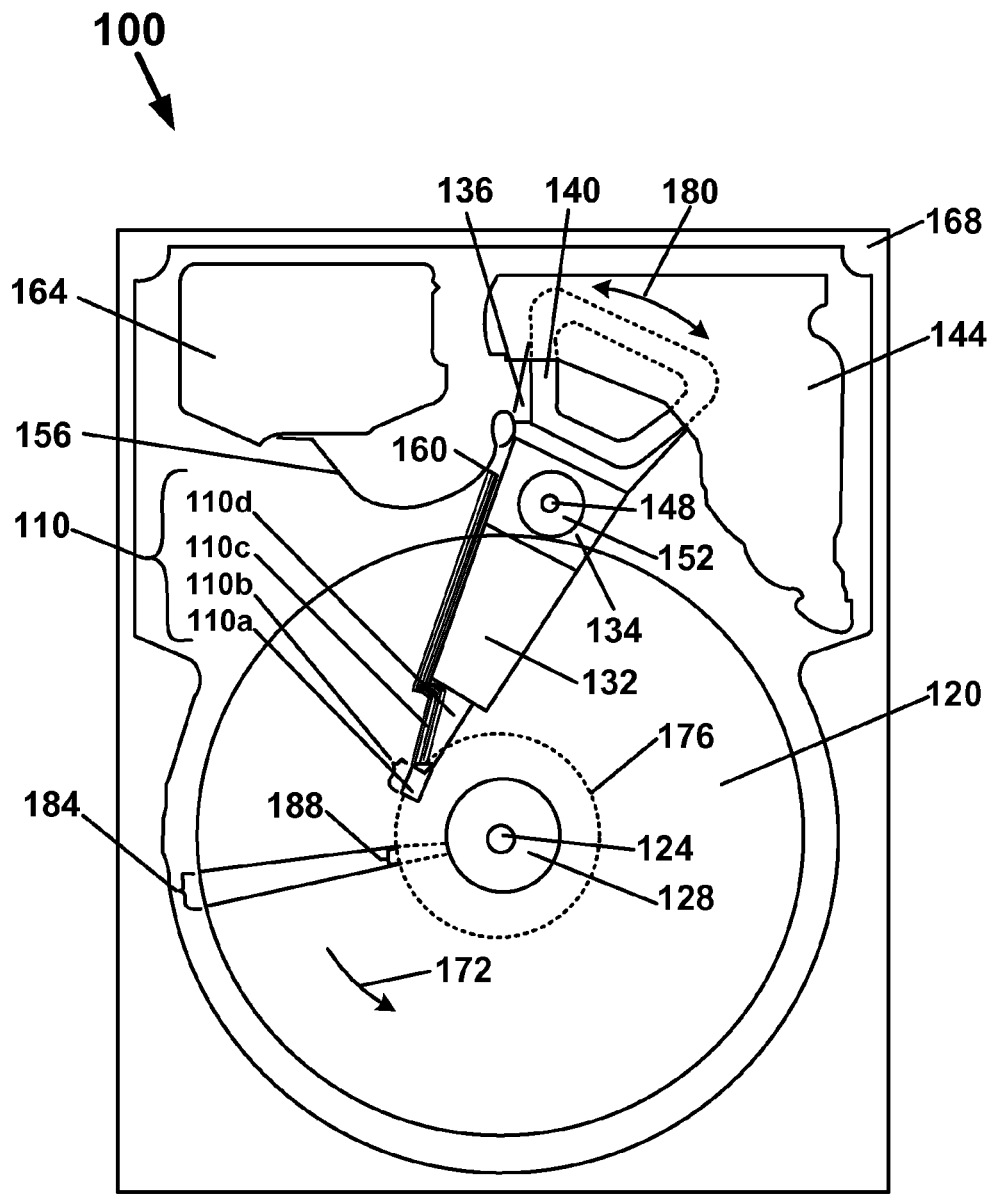
FIG. 1 is a plan view of a hard-disk drive (HDD) illustrating the functional arrangement of components of the HDD in accordance with an embodiment of the present invention.

Physical Description of Embodiments of the Present Invention for an Integrated Pivot-Carriage With reference to FIG. 1, in accordance with an embodiment of the present invention, a plan view of a HDD 100 is shown. FIG. 1 illustrates the functional arrangement of an integrated pivot-carriage 300 (see FIG. 3) with respect to other components of the HDD 100. The HDD 100 includes at least one HGA 110 including a magnetic-recording head 110a, a lead suspension 110c attached to the magnetic-recording head 110a, and a load beam 110d attached to a slider 110b, which includes the magnetic-recording head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the magnetic-recording disk 120. The magnetic-recording head 110a includes a write element, a so-called writer, and a read element, a so-called reader, for respectively writing and reading information stored on the magnetic-recording disk 120 of the HDD 100. The magnetic-recording disk 120 or a plurality (not shown) of magnetic-recording disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the magnetic-recording disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the magnetic-recording head 110a, are provided by a flexible cable 156. Interconnection between the flexible cable 156 and the magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the magnetic-recording head 110a of the HGA 110. The electrical signal provided to the drive motor enables the drive motor to spin providing a torque to the spindle 124 which is in turn transmitted to the magnetic-recording disk 120 that is affixed to the spindle 124 by the disk clamp 128; as a result, the magnetic-recording disk 120 spins in a direction 172. The spinning magnetic-recording disk 120 creates a cushion of air that acts as an air bearing on which the air-bearing surface (ABS) of the slider 110b rides so that the slider 110b flies above the surface of the magnetic-recording disk 120 without making contact with a thin magnetic-recording medium of the magnetic-recording disk 120 in which information is recorded. The electrical signal provided to the voice coil 140 of the VCM enables the magnetic-recording head 110a of the HGA 110 to access a track 176 on which information is recorded. Thus, the armature 136 of the VCM swings through an arc 180 which enables the HGA 110 attached to the armature 136 by the arm 132 to access various tracks on the magnetic-recording disk 120. Information is stored on the magnetic-recording disk 120 in a plurality of concentric tracks (not shown) arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the magnetic-recording head 110a of the HGA 110 reads the servo-burst-signal pattern which provides a position-error-signal (PES) to the servo electronics, which controls the electrical signal provided to the voice coil 140 of the VCM, enabling the magnetic-recording head 110a to follow the track 176. Upon finding the track 176 and identifying a particular sectored track portion 188, the magnetic-recording head 110a either reads data from the track 176 or writes data to the track 176 depending on instructions received by the disk controller from an external agent, for example, a microprocessor of a computer system.

Embodiments of the present invention also encompass a HDD 100 that includes the HGA 110, the magnetic-recording disk 120 rotatably mounted on the spindle 124, the arm 132 attached to the HGA 110 and the integrated pivot-carriage 300 (see FIG. 3) attached to the arm 132. Therefore, embodiments of the present invention incorporate within the environment of the HDD 100, without limitation, the subsequently described embodiments of the present invention for the integrated pivot-carriage 300 (see FIG. 3) as further described in the following discussion.

Figure 2:
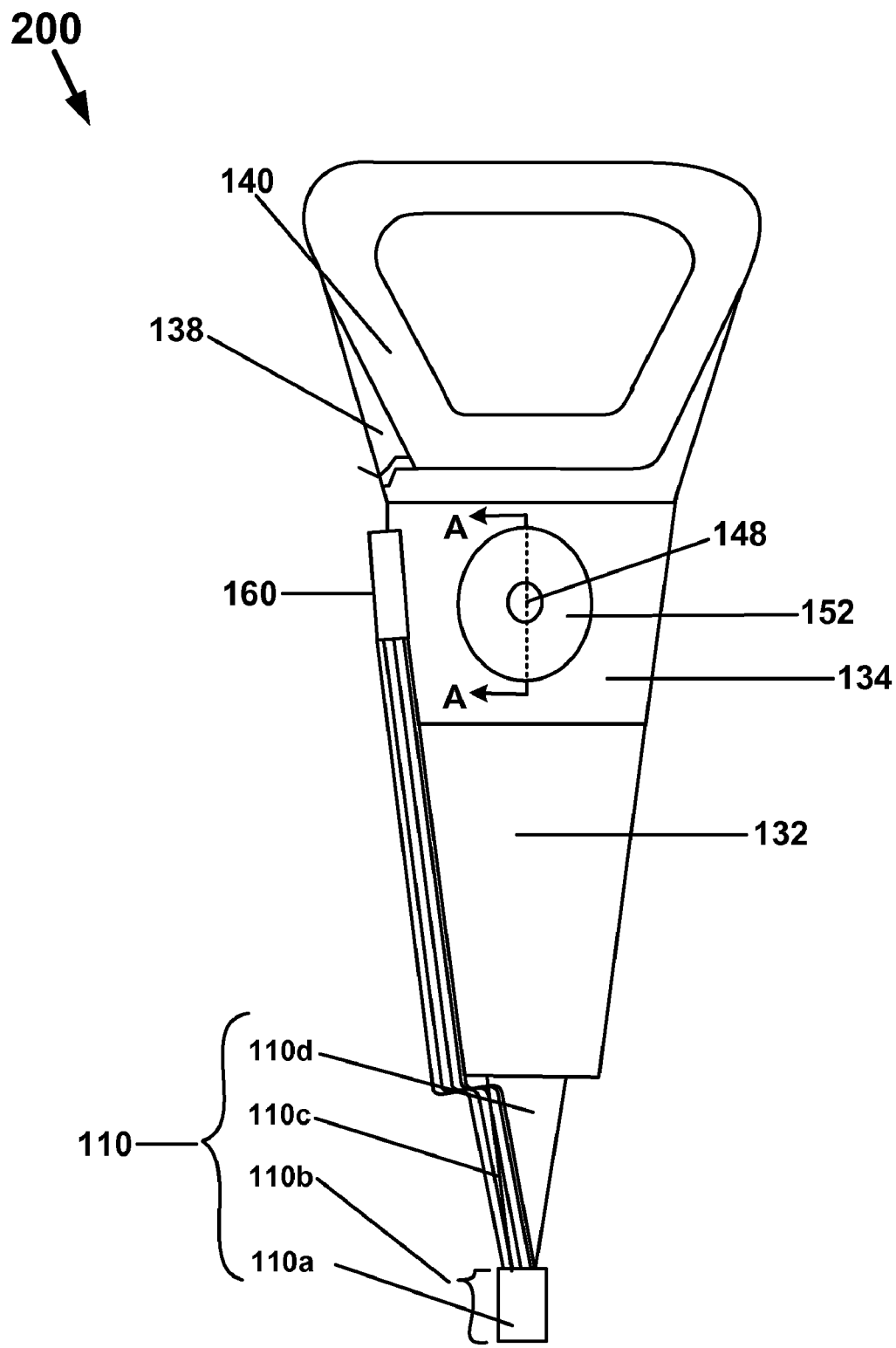
FIG. 2 is a plan view of a head-arm-assembly (HAA) illustrating the functional arrangement of components of the HAA with respect to an integrated pivot-carriage in accordance with an embodiment of the present invention.

With reference now to FIG. 2, in accordance with an embodiment of the present invention, a plan view of a head-arm-assembly (HAA) is shown. FIG. 2 illustrates the functional arrangement of the HAA with respect to the integrated pivot-carriage 300 (see FIG. 3). The HAA includes the HGA 110 and the arm 132. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152. The line labeled AA designates the location of a cutting plane used to illustrate a detailed configuration of the integrated pivot-carriage 300 shown in FIGS. 3 and 4 and carriages 534, 535, 536 and 134 in various stages of fabrication shown in FIG. 5.

In contrast with an embodiment of the present invention, a conventional method of fastening the conventional carriage to the conventional pivot-bearing assembly is to use a set screw threaded through the conventional carriage block to lock the outer race of a ball-bearing in the conventional pivot-bearing assembly in place. Also, in between the set screw and the conventional pivot-bearing assembly, a sleeve is often placed that acts to fill empty space not filled by other components between the inside diameter of the inner rounded surface of the conventional carriage and the outside diameter of the outer rounded surface of the conventional pivot-bearing assembly. In addition, an adhesive compound might be used to fill empty space not filled by other components between the inside diameter of the inner rounded surface of the conventional carriage and the outside diameter of the outer rounded surface of the conventional pivot-bearing assembly and to bind the conventional pivot-bearing assembly to the conventional carriage. Another difference between an embodiment of the present invention and the conventional carriage and conventional pivot-bearing assembly is that a discrete spacer block may be used to separate an upper ball-bearing from a lower ball-bearing of a paired ball-bearing set used in the conventional pivot-bearing assembly. However, all of these design differences associated with the conventional carriage and conventional pivot-bearing assembly add additional cost to the assembly of the HDD. In particular, the fastening methods are susceptible to the conventional pivot-bearing assembly becoming loose and affecting the dimensional tolerances between the conventional pivot-bearing assembly and the conventional carriage; and, the discrete spacer block is susceptible to tolerance uncertainties attending the placement of the ball-bearings and the discrete spacer block in the conventional carriage, which raises concerns over reliability of an HDD incorporating such components.

Such problems in the control of these critical dimensional tolerances can result in yield losses during the manufacturing process and what is worse lead to potential reliability problems after product delivery. The classic signature of these problems is increased non-repeatable runout (NRRO) when accessing a track through the servo-feedback mechanism that controls the VCM. NRRO is an error that results in positioning a magnetic-recording head over a sought-after track during a seek operation controlled by the servo electronics. The NRRO is measured by a large PES encountered during a seek operation, and indicates that the magnetic-recording head is not properly centered over the sought-after track for reading and writing operations. Embodiments of the present invention are directed to reducing errors due to NRRO associated with a loose sleeve, a loose set screw, an improper placement of the discrete spacer block, or an improper bonding of the conventional pivot-bearing assembly. Moreover, embodiments of the present invention reduce the cost of assembly by eliminating the costs of the sleeve, the set screw, the discrete spacer block and bonding the conventional pivot-bearing assembly to the conventional carriage. In addition, the elimination of the sleeve allows for better control of the preload on the pivot, and allows for the selection of ball-bearings having larger diameter balls which improves the mechanical performance of the integrated pivot-carriage 300 (see FIG. 3). Therefore, designs of the integrated pivot-carriage 300 (see FIG. 3) that are sleeveless, e.g. without a sleeve, and without a discrete spacer block are within the spirit and scope of embodiments of the present invention.

Figure 3:
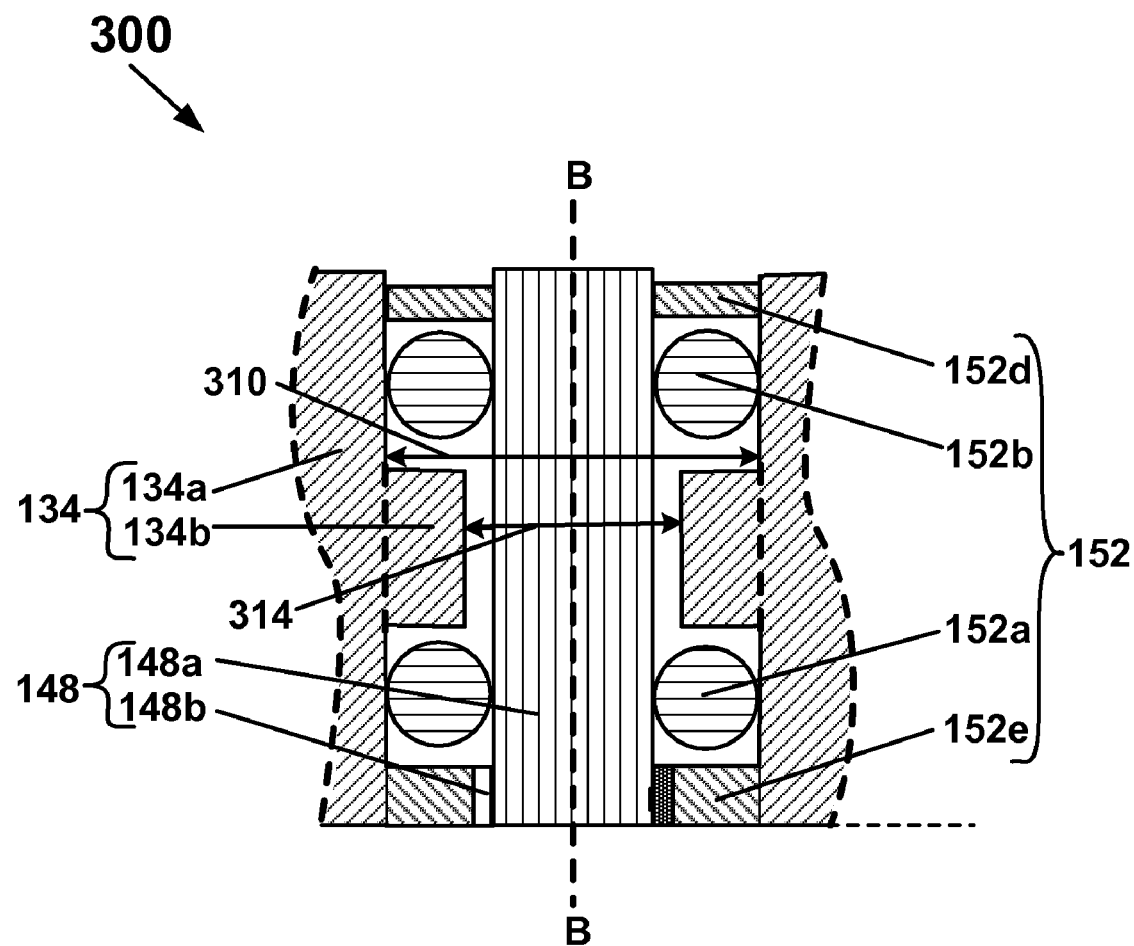
FIG. 3 is a cross-sectional view of the integrated pivot-carriage illustrating the functional arrangement of components of the integrated pivot-carriage in accordance with an embodiment of the present invention.

With reference now to FIG. 3, in accordance with embodiments of the present invention, a cross-sectional view of the integrated pivot-carriage 300 is shown. The cross-sectional view of the integrated pivot-carriage 300 corresponds with the line labeled AA of FIG. 2 that designates the location of the cutting plane of the cross-sectional view. FIG. 3 illustrates the functional arrangement of components of the integrated pivot-carriage 300. The integrated pivot-carriage 300 of the HDD 100 includes the carriage 134, the pivot-shaft 148, and at least one raceless ball-bearing 152a of the pivot-bearing assembly 152. The carriage 134 includes a center-bore, a body portion 134a and an integrated bearing-spacer portion 134b. As shown in FIG. 3, the pivot-shaft 148, and the at least one raceless ball-bearing 152a of the pivot-bearing assembly 152 fill portions of the center-bore in the carriage 134. The integrated bearing-spacer portion 134b of the carriage 134 is produced by a machining process (see FIG. 5 and discussion thereof). Machining the integrated bearing-spacer portion 134b of the carriage 134 improves the mechanical tolerances associated with vertical placement of ball-bearings along the axis of the pivot-shaft 148, shown as center-line BB, and also reduces NRRO.

Figure 4:
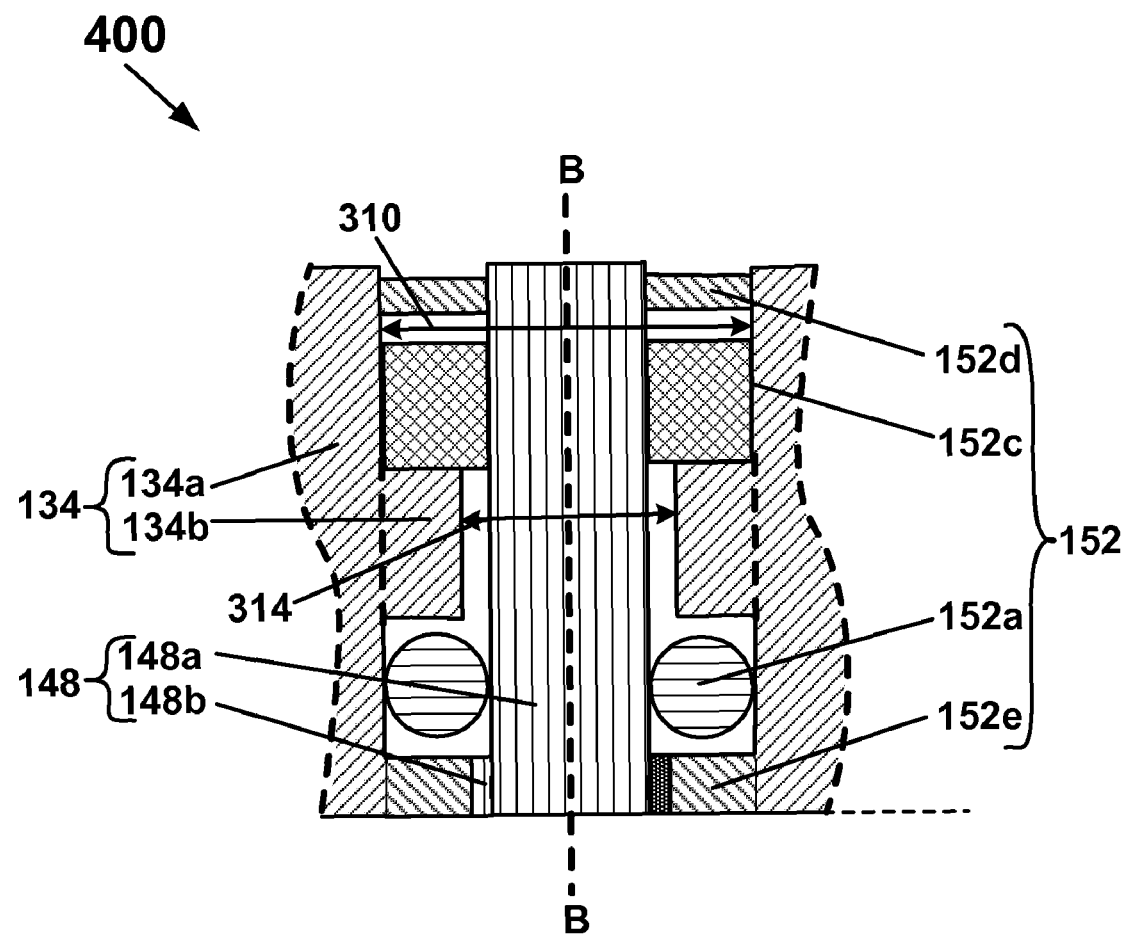
FIG. 4 is a cross-sectional view of a hybrid integrated pivot-carriage illustrating the functional arrangement of components of the hybrid integrated pivot-carriage in accordance with an embodiment of the present invention.
Figure 5:
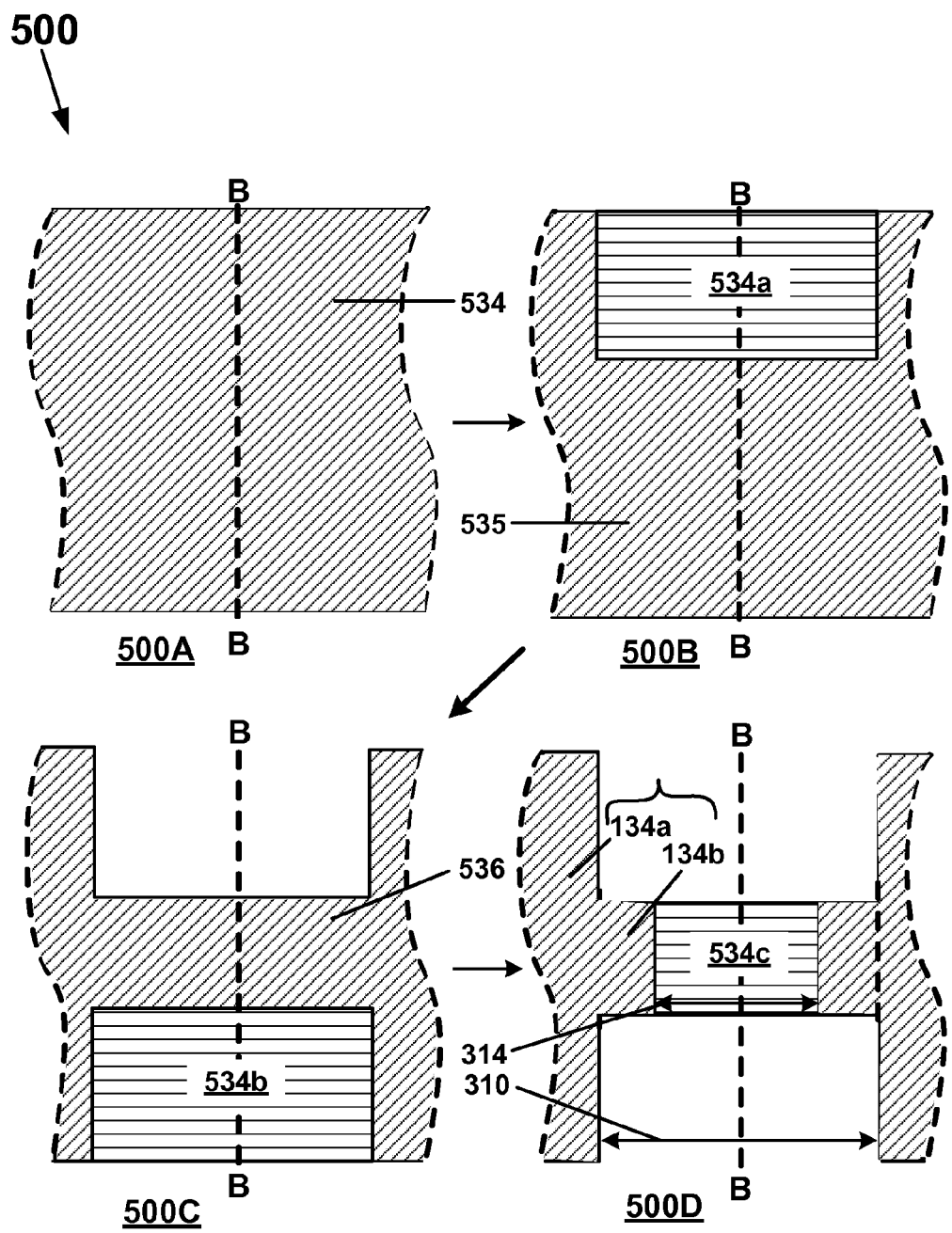
FIG. 5 is a cross-sectional view of the carriage of an integrated pivot-carriage illustrating the manner of fabricating the carriage in accordance with an embodiment of the present invention.

With further reference to FIG. 3, in accordance with embodiments of the present invention, portions of the integrated-pivot carriage 300 have a central axis of symmetry designated by center-line BB in FIGS. 3, 4 and 5. It should be appreciated that the outer rounded surface of the pivot-shaft 148 and the inner rounded surface of the center-bore of the carriage 134 of the integrated pivot-carriage 300 are substantially circularly symmetric about center-line BB. As used herein, "substantially circularly symmetric" means that points on the outer rounded surface of the pivot-shaft 148, and similarly for points on the inner rounded surface of the center-bore of the carriage 134, of the integrated pivot-carriage 300 that are disposed on opposite sides of the center-line BB along a perpendicular to and through the center-line BB are symmetrically disposed at about equal distances with respect to the center-line BB, so far as is possible within manufacturing tolerances. Thus, corresponding to the left-hand-side portion of the integrated bearing-spacer portion 134b shown in FIG. 3, there is a symmetrically disposed right-hand-side portion of the integrated bearing-spacer portion 134b on the opposite side of the pivot-shaft 148 at an equal distance from the center-line BB such that the integrated bearing-spacer portion 134b may have the shape of an annular cylinder, for example, a cylinder with a concentric hole in the center. In like fashion, the pivot-shaft 148 is disposed relative to the center-line BB such that the pivot-shaft 148 includes a rod-shaped, or bar, portion 148a that may have the shape of a cylinder, and a flanged portion 148b at the bottom of the pivot-shaft 148 that may have the shape of an annular cylinder. Similar considerations with respect to circular symmetry would apply to the structure and design of an upper shield portion 152d and a lower shield portion 152e of the pivot-bearing assembly 152 shown in FIG. 3 that also may have the shape of annular cylinders. As used herein, "below," "lower" and "bottom" refers to the bottom of FIGS. 3, 4 and 5, for example towards the side of FIGS. 3, 4 and 5 where the flanged portion 148b of the pivot-shaft 148 is shown, or where the pivot-shaft 148 would be attached to the HDD housing 168, and "above," "upper" and "top" refers to the top of FIGS. 3, 4 and 5, for example towards the side of FIGS. 3, 4 and 5 opposite the side to which "below," "lower" and "bottom" refers.

However, with further reference to FIG. 3, in accordance with embodiments of the present invention, the raceless ball-bearing 152a is not disposed with circular symmetry about the center-line BB of the pivot-shaft 148, but, the balls of the raceless ball-bearing 152a may be disposed with rotational symmetry about the center-line BB of the pivot-shaft 148 as suggested by the symmetrically disposed left-hand-side circle at an equal distance from the center-line BB opposite a right-hand-side circle, both representing raceless ball-bearing 152a. The raceless ball-bearing 152a also includes a retainer ring (not shown) that serves to separate and retain balls in the raceless ball-bearing 152a. It should be appreciated that the retainer ring is not shown so as not to obscure embodiments of the present invention. A retainer ring of the raceless ball-bearing 152a may, or may not, have rotational symmetry with respect to the center-line BB. The rotational symmetry of the raceless ball-bearing would depend on the uniformity and the spacing of the balls, so far as is possible within manufacturing tolerances. Similar considerations with respect to rotational symmetry would apply to the structure and design of a second raceless ball-bearing 152b. Therefore, to simplify the discussion, corresponding portions of the integrated pivot-carriage 300 on opposite sides of this central axis of symmetry, center-line BB, have not been labeled so as not to obscure embodiments of the present invention.

With further reference to FIG. 3, in accordance with embodiments of the present invention, the pivot-shaft 148 is configured to provide support for rotation of the carriage 134 and is disposed within the center-bore of the carriage 134. Also, the raceless ball-bearing 152a is configured to allow rotation of the carriage 134 about the pivot-shaft 148 and is disposed between the pivot-shaft 148 and the carriage 134. The raceless ball-bearing 152a rides between the inner rounded surface of the center-bore of the carriage 134 having first inside diameter 310, which substitutes for an outer race for the raceless ball-bearing 152a, and the outer rounded surface of the pivot-shaft 148, which substitutes for an inner race for the raceless ball-bearing 152a. Moreover, in accordance with an embodiment of the present invention, a sleeve and a discrete spacer block are not disposed in the center-bore between the carriage 134 and the pivot-shaft 148, such that the integrated pivot-carriage 300 is both sleeveless and without a discrete spacer block. The pivot-bearing assembly 152 may include the raceless ball-bearing 152a, the second raceless ball-bearing 152b, the upper shield portion 152d and the lower shield portion 152e. The carriage 134 includes the body portion 134a and an integrated bearing-spacer portion 134b. The second portion, the integrated bearing-spacer portion 134b, of the carriage 134 has a smaller second inside diameter 314 across the center-bore than the first inside diameter 310 across the center-bore of a first portion of the carriage 134 configured to receive a ball-bearing. The at least one raceless ball-bearing 152a may include a first raceless ball-bearing, identified with raceless ball-bearing 152a shown in FIG. 3, disposed below the integrated bearing-spacer portion 134b of the carriage 134. The second raceless ball-bearing 152b is configured to allow rotation of the carriage 134 about the pivot-shaft 148. The second raceless ball-bearing 152b is disposed between the pivot-shaft 148 and the carriage 134. The second raceless ball-bearing 152b rides between the inner rounded surface of the center-bore of the carriage 134 having first inside diameter 310, which substitutes for the outer race for the second raceless ball-bearing 152b, and the outer rounded surface of the pivot-shaft 148, which substitutes for the inner race for the second raceless ball-bearing 152b. The second raceless ball-bearing 152b is disposed above the integrated bearing-spacer portion 134b of the carriage 134. In accordance with embodiments of the present invention, a raceless ball-bearing, including a first raceless ball-bearing or the second raceless ball-bearing 152b, may be a raceless RO bearing, where "RO bearing" is a term of art known in the art of HDD manufacturing. The upper shield portion 152d and the lower shield portion 152e of the pivot-bearing assembly 152 serve to sequester within the center-bore of the carriage 134 away from the head-disk interface any wear debris generated by the first and second raceless ball-bearings 152a and 152b, volatile organic compounds, such as lubricants, or other volatile gases associated with the first and second raceless ball-bearings 152a and 152b.

With reference now to FIG. 4, in accordance with embodiments of the present invention, a cross-sectional view of an alternative embodiment of an integrated pivot-carriage, a hybrid integrated pivot-carriage 400, is shown. The cross-sectional view of the hybrid integrated pivot-carriage 400 corresponds with the line labeled AA of FIG. 2 that designates the location of the cutting plane of the cross-sectional view. FIG. 4 illustrates the functional arrangement of components of the hybrid integrated pivot-carriage 400. The alternative embodiment of the integrated pivot-carriage, the hybrid integrated pivot-carriage 400, of the HDD 100 includes the carriage 134, the pivot-shaft 148, and at least one raceless ball-bearing 152a of the pivot-bearing assembly 152. The carriage 134 includes the center-bore, the body portion 134a and the integrated bearing-spacer portion 134b. As shown in FIG. 4, the pivot-shaft 148, and the at least one raceless ball-bearing 152a of the pivot-bearing assembly 152 fill portions of the center-bore in the carriage 134. The pivot-shaft 148 is configured to provide support for rotation of the carriage 134 and is disposed within the center-bore of the carriage 134. Also, the raceless ball-bearing 152a is configured to allow rotation of the carriage 134 about the pivot-shaft 148 and is disposed between the pivot-shaft 148 and the carriage 134. The raceless ball-bearing 152a rides between the inner rounded surface of the center-bore of the carriage 134 having first inside diameter 310, which substitutes for the outer race for the raceless ball-bearing 152a, and the outer rounded surface of the pivot-shaft 148, which substitutes for the inner race for the raceless ball-bearing 152a. The alternative embodiment of the integrated pivot-carriage, the hybrid integrated pivot-carriage 400, includes a conventional ball-bearing 152c with an inner race and an outer race. The conventional ball-bearing 152c is configured to allow rotation of the carriage 134 about the pivot-shaft 148 and is disposed between the pivot-shaft 148 and the carriage 134. The conventional ball-bearing 152c may be disposed above the integrated bearing-spacer portion 134b of the carriage 134.

With reference now to FIG. 5, in accordance with embodiments of the present invention, cross-sectional views 500 of the carriage 134 of the integrated pivot-carriage 300 in various stages of fabrication are shown. FIG. 5 illustrates the manner of fabricating the carriage 134 by a machining process. 500A is a cross-sectional view of a pre-machined carriage 534 prior to machining the center-bore of the carriage 134. The center-line BB of the center-bore that is to be machined in the pre-machined carriage 534 is shown. 500B is a cross-sectional view of a first partially machined carriage 535 after an upper portion 534a of the center-bore of the carriage 134 disposed above the integrated bearing-spacer portion 134b has been removed by machining. 500C is a cross-sectional view of a second partially machined carriage 536 after a lower portion 534b of the center-bore of the carriage 134 disposed below the integrated bearing-spacer portion 134b has been removed by machining. 500D is a cross-sectional view of the carriage 134 after a central portion 534c of the center-bore of the carriage 134 disposed at the location of the concentric hole in the center of the integrated bearing-spacer portion 134b has been removed by machining. In 500D, the body portion 134a of the carriage 134 is also shown. The center-bore of the carriage 134 is defined by portions of the carriage 134 removed by machining and includes: the upper portion 534a of the center-bore of the carriage 134 disposed above the integrated bearing-spacer portion 134b, the lower portion 534b of the center-bore of the carriage 134 disposed below the integrated bearing-spacer portion 134b, and the central portion 534c of the center-bore of the carriage 134 disposed at the location of the concentric hole in the center of the integrated bearing-spacer portion 134b. From the preceding discussion concerning the circular symmetry about the center-line BB, it should be recognized that the center-bore of the carriage 134 is substantially circularly symmetric. As shown in 500D, the inner rounded surface of the center-bore of the carriage 134 having first inside diameter 310 is defined by the diameter of the upper portion 534a of the center-bore of the carriage 134 and by the diameter of the lower portion 534b of the center-bore of the carriage 134, which are essentially the same diameter. As used herein, "essentially the same diameter" means that the diameter of the upper portion 534a of the center-bore of the carriage 134 is about equal to the diameter of the lower portion 534b of the center-bore of the carriage 134, so far as is possible within manufacturing tolerances. It should be recognized that the first portion of the center-bore of the carriage 134 may be selected from the group consisting of the upper portion 534a of the center-bore of the carriage 134 disposed above the integrated bearing-spacer portion 134b and the lower portion 534b of the center-bore of the carriage 134 disposed below the integrated bearing-spacer portion 134b. However, embodiments of the present invention do not preclude embodiments in which the diameter of the upper portion 534a of the center-bore of the carriage 134 differs from and is not equal to the diameter of the lower portion 534b of the center-bore of the carriage 134 that are within the spirit and scope of embodiments of the present invention.

Figure 6:
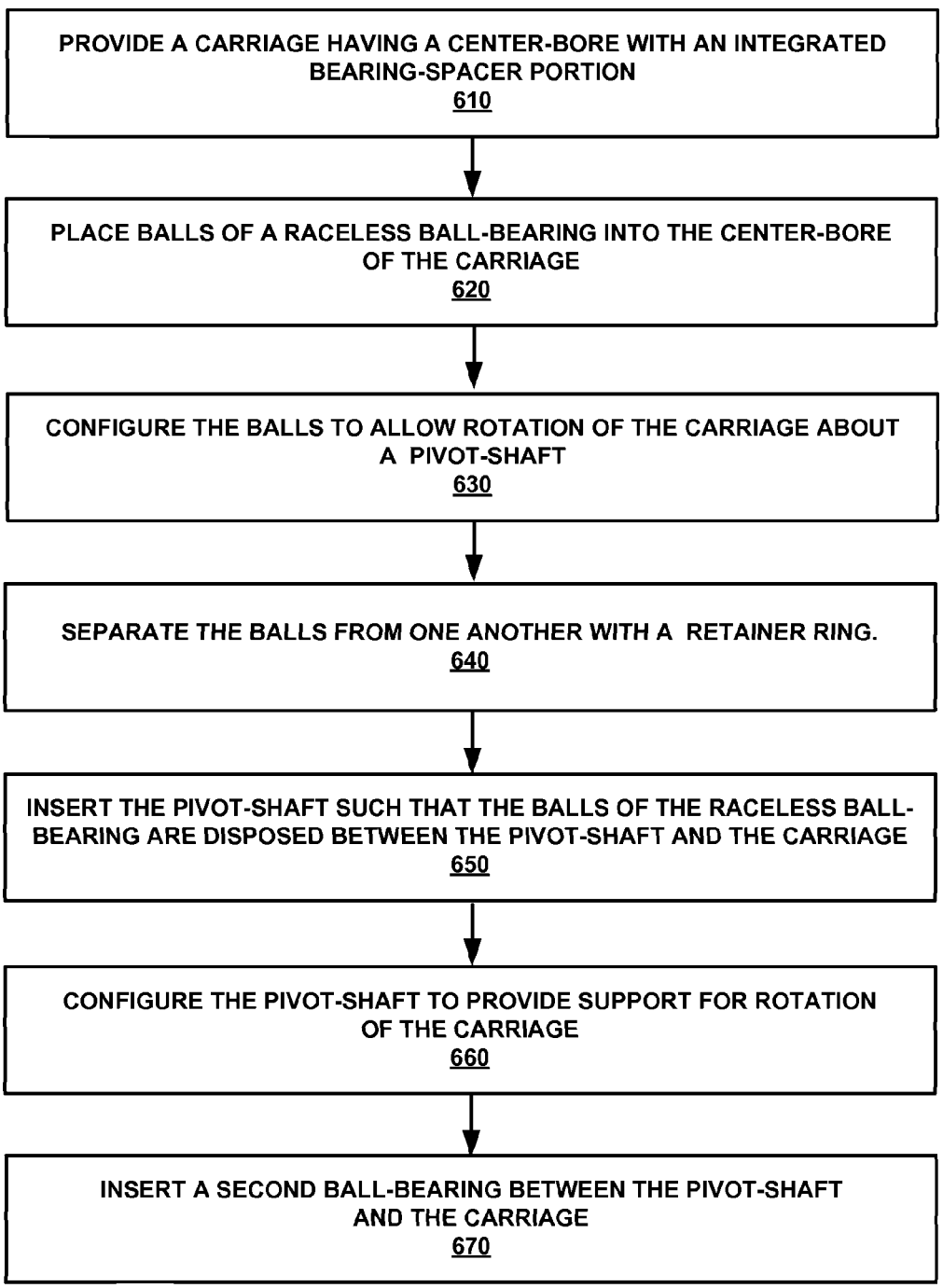
FIG. 6 is flow chart illustrating a method for manufacturing an integrated pivot-carriage in accordance with an embodiment of the present invention.

Description of Embodiments of the Present Invention for a Method for Manufacturing an Integrated Pivot-Carriage of a Hard-Disk Drive With reference now to FIG. 6, in accordance with an embodiment of the present invention, a flow chart 600 illustrates a method for manufacturing an integrated pivot-carriage of a HDD. At 610, a carriage having a center-bore with an integrated bearing-spacer portion is provided. The carriage having the center-bore with the integrated bearing-spacer portion may be provided as next described. A first portion of the center-bore of the carriage is machined with a first inside diameter. A second portion, the integrated bearing-spacer portion, of the center-bore of the carriage is machined with a second inside diameter. The first portion of the center-bore of the carriage is machined to have the first inside diameter greater than the second inside diameter of the center-bore of the carriage. The first portion of the center-bore of the carriage is configured to receive a ball-bearing. The ball-bearing may be a raceless ball-bearing, or a conventional ball-bearing with an inner race and an outer race. The first portion of the center-bore of the carriage may be selected from the group consisting of an upper portion of the center-bore of the carriage disposed above the integrated bearing-spacer portion and a lower portion of the center-bore of the carriage disposed below the integrated bearing-spacer portion.

With further reference to FIG. 6, in accordance with an embodiment of the present invention, at 620, balls of a raceless ball-bearing are placed into the center-bore of the carriage. The raceless ball-bearing may be a raceless RO bearing. At 630, the balls of the raceless ball-bearing are configured to allow rotation of the carriage about a pivot-shaft. The balls of the ball-bearing may be disposed in proximity to the inner rounded surface and within the center-bore of the carriage. At 640, the balls of the raceless ball-bearing are separated from one another with a retainer ring. The separation of the balls may be such that the balls are disposed at equal angular intervals about the center-line BB of the pivot-shaft. The retainer ring may be placed above the balls located in the center-bore of the carriage. At 650, the pivot-shaft is inserted such that the balls of the raceless ball-bearing are disposed between the pivot-shaft and the carriage. A lower shield portion of the pivot-bearing assembly may then be attached to the pivot shaft. At 660, the pivot-shaft is configured to provide support for rotation of the carriage. At 670, a second ball-bearing is inserted between the pivot-shaft and the carriage. The second ball-bearing may be a raceless ball-bearing, or a conventional ball-bearing with an inner race and an outer race.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An integrated pivot-carriage for a hard-disk drive comprising:
    a carriage having a center-bore with an integrated bearing-spacer portion;
    a pivot-shaft configured to provide support for rotation of said carriage, said pivot-shaft disposed within said center-bore of said carriage;
    at least one raceless ball-bearing configured to allow rotation of said carriage about said pivot-shaft, said raceless ball-bearing disposed between said pivot-shaft and said carriage; and
    a conventional ball-bearing with an inner race and an outer race, said conventional ball-bearing configured to allow rotation of said carriage about said pivot-shaft and disposed between said pivot-shaft and said carriage;
    wherein said conventional ball-bearing is disposed above said integrated bearing-spacer portion of said carriage.

2. The integrated pivot-carriage recited in claim 1, wherein no sleeve is disposed in said center-bore between said carriage and said pivot-shaft.

3. The integrated pivot-carriage recited in claim 1, wherein said integrated bearing-spacer portion of said carriage is produced by a machining process.

4. The integrated pivot-carriage recited in claim 3, wherein said integrated bearing-spacer portion of said carriage has a smaller second inside diameter across said center-bore than a first inside diameter across said center-bore of a first portion of said carriage configured to receive a ball-bearing.

5. The integrated pivot-carriage recited in claim 1, wherein said at least one raceless ball-bearing comprises a first raceless ball-bearing disposed below said integrated bearing-spacer portion of said carriage.

6. The integrated pivot-carriage recited in claim 1, further comprising:
    a second raceless ball-bearing configured to allow rotation of said carriage about said pivot-shaft, said second raceless ball-bearing disposed between said pivot-shaft and said carriage.

7. The integrated pivot-carriage recited in claim 6, wherein said second raceless ball-bearing is disposed above said integrated bearing-spacer portion of said carriage.

8. A hard-disk drive comprising:
    a head-gimbal assembly comprising:
        a magnetic-recording head; and
        a load beam attached at a gimbal portion of said load beam to a slider including said magnetic-recording head;
    a magnetic-recording disk rotatably mounted on a spindle;
    an arm attached to said head-gimbal assembly; and
    an integrated pivot-carriage attached to said arm comprising:
        a carriage having a center-bore with an integrated bearing-spacer portion;
        a pivot-shaft configured to provide support for rotation of said carriage, said pivot-shaft disposed within said center-bore of said carriage; and
        at least one raceless ball-bearing configured to allow rotation of said carriage about said pivot-shaft, said raceless ball-bearing disposed between said pivot-shaft and said carriage; and
        a conventional ball-bearing with an inner race and an outer race, said conventional ball-bearing configured to allow rotation of said carriage about said pivot-shaft and disposed between said pivot-shaft and said carriage;
        wherein said conventional ball-bearing is disposed above said integrated bearing-spacer portion of said carriage.

9. The hard-disk drive recited in claim 8, wherein no sleeve is disposed in said center-bore between said carriage and said pivot-shaft.

10. The hard-disk drive recited in claim 8, wherein said integrated bearing-spacer portion of said carriage is produced by a machining process.

11. The hard-disk drive recited in claim 10, wherein said integrated bearing-spacer portion of said carriage has a smaller second inside diameter across said center-bore than a first inside diameter across said center-bore of a first portion of said carriage configured to receive a ball-bearing.

12. The hard-disk drive recited in claim 8, wherein said at least one raceless ball-bearing comprises a first raceless ball-bearing disposed below said integrated bearing-spacer portion of said carriage.

13. The hard-disk drive recited in claim 8, further comprising:
   a second raceless ball-bearing configured to allow rotation of said carriage about said pivot-shaft, said second raceless ball-bearing disposed between said pivot-shaft and said carriage.

14. The hard-disk drive recited in claim 13, wherein said second raceless ball-bearing is disposed above said integrated bearing-spacer portion of said carriage.

15. A method for manufacturing an integrated pivot-carriage of a hard-disk drive, said method comprising:
   providing a carriage having a center-bore with an integrated bearing-spacer portion;
   placing balls of a raceless ball-bearing into said center-bore of said carriage;
   configuring said balls to allow rotation of said carriage about a pivot-shaft;
   separating said balls from one another with a retainer ring;
   inserting said pivot-shaft such that said balls of said raceless ball-bearing are disposed between said pivot-shaft and said carriage;
   configuring said pivot-shaft to provide support for rotation of said carriage;
   inserting a second ball-bearing between said pivot-shaft and said carriage; and
   configuring a conventional ball-bearing with an inner race and an outer race, said conventional ball-bearing configured to allow rotation of said carriage about said pivot-shaft and disposed between said pivot-shaft and said carriage;
   wherein said conventional ball-bearing is disposed above said integrated bearing-spacer portion of said carriage.

16. The method recited in claim 15, further comprising:
   machining a first portion of said center-bore of said carriage configured to receive a ball-bearing with a first inside diameter greater than a second inside diameter of said integrated bearing-spacer portion of said center-bore of said carriage.

* * * * *